Patented June 25, 1940

2,205,858

UNITED STATES PATENT OFFICE 2,205,858

LUBRICANT CONTAINING ORGANIC SULPHIDES

Louis A. Mikeska and Floyd Laverne Miller, Elizabeth, N. J., assignors to Standard Oil Development Company, a corporation of Delaware No Drawing. Application January 23, 1932, Serial No. 588,486

13 Claims. (Cl. 87—9)

This invention relates generally to improvements in oils or greases containing combined sulphides. More particularly the invention provides a stable high sulphur lubricating oil adapted for extreme pressure, for use as a cutting oil in metal working and the like.

The invention is particularly directed to the use in lubricating compositions of organic polysulphides and related compounds prepared from cracked naphtha sludges containing mercaptans and the like. The mixtures of the organic sulphides as prepared from the mercaptans occurring in the distillation or destructive distillation products of petroleum and other natural occurring hydrocarbons are especially suitable for the composition and these mercaptans provide a very convenient and cheap source of combined sulphides for the composition.

Such sulphur compounds as mixed sulphides, disulphides, trisulphides, tetrasulphides, pentasulphides and the like can be manufactured from mixed mercaptans. For example, the pentasulphides can easily be prepared by reacting mercaptans with sulphur monochloride to form the tetrasulphides which in turn can be converted into the pentasulphides by adding the theoretical amount of sulphur and heating to approximately 50° C. In general the polysulphides higher than the disulphides, for example the tetrasulphides and pentasulphides are preferred for use in a lubricating composition. Other symmetrical or mixed alkyl, aryl, or alkyl aryl sulphur derivatives of this character or thio-ethers are advantageous for this purpose.

By way of example only, one method of preparing polysulphides is one in which sour gas oil is treated with free sulphur to yield polysulphides and then distilled under vacuum at a temperature such that the polysulphides will not distill over, thus obtaining a bottoms containing these sulphur bodies.

As still another example, a method of preparing the disulphides is described and claimed in the co-pending application No. 537,175 filed May 13, 1931, of Herbert G. M. Fischer in which a spent soda solution used for treating sour cracked distillates is subjected to a carefully limited treatment with oxygen whereby a mixture of disulphides is obtained. In this method, a distillate of 90 to 95° Baumé, boiling below 300° F., and containing 0.18 to 0.3% sulphur, from cracked high sulphur gas oil, is treated with 0.1 to 0.2 volume of a 3 to 6% aqueous solution of caustic soda at 80 pounds pressure. The sulphur content of the naphtha is reduced by this treatment to 0.02 to 0.03%, and the caustic soda solution contains a mixture of mercaptides averaging about ethyl mercaptides in molecular weight. The spent soda solution from the above treatment is heated to about 210° F. with steam, and preferably within the limits of 100 to 400° F., and without reduction in pressure is thoroughly mixed with a carefully regulated amount of oxygen. The amount of oxygen used is desirably somewhat less than that required for the complete regeneration of the caustic soda solution. Under these conditions the reaction proceeds rapidly and smoothly and the oxygen is entirely used up. Other gas mixtures containing oxygen and inert gases may be used such as air, or air enriched with oxygen, but with such mixtures the reaction rate is slower, and it is necessary to recover large quantities of the vaporized product from the fixed gases leaving the process. In batch operation, as in a bomb, it is preferable to supply an excess of oxygen, and about 20 to 40% has been found advantageous.

After the reaction of the spent soda solution with oxygen the resulting mixture is cooled to substantially atmospheric temperature, and is passed into a relatively large drum where it is permitted to separate into two layers. The bottom layer consists almost entirely of caustic soda with a very small amount of unconverted mercaptans or other sulphur compounds, and the upper layer consists almost entirely of disulphides. The di-sulphide mixture secured in this operation boiled between 275 and 340° F., contained 52.3% sulphur by weight, and had a specific gravity of 0.982. These di-sulphides may be further purified by suitable methods for the removal of any residual traces of mercaptans or other corrosive sulphur compounds.

As a further example an improved method of preparing the thio-ethers is one in which mercaptans recovered from a similar spent soda solution by steam distillation are passed in vapor form over catalysts and a product containing thio-ethers and hydrogen sulphide is secured.

Polysulphides derived from mercaptans from other sources than naphtha treating also can be used. Similarly polysulphides derived from mercaptans by other methods than described above are contemplated.

The exact composition of the mixtures obtained in the above processes for the production of polysulphides and thioethers from petroleum mercaptans is not known. However, it is unnecessary to separate these mixtures into ultimate pure compounds and a simple fractionation to secure mixtures of any desired volatility and boiling range available is sufficient to produce suitable lubricating compositions. Pure sulphides may be used for this purpose.

By way of example only, a lubricating composition according to the invention may include mixed pentasulphides and tetrasulphides to the extent of about 5% by volume and lubricating oil of 50 Saybolt seconds at 210° F. viscosity to the extent of about 95% by volume. The relative percentages can be varied as desired and the character of the polysulphides and oleaginous material can also be varied.

Other sources of polysulphides are also found to give suitable sulphur bodies for this invention for instance, in refining cracked naphthas such as naphthas derived from sulphur containing crude oils such as West Texas crude, the cracked naphthas are treated with strong sulphuric acid whereby a sludge is obtained which is high in sulphur content of the nature of polysulphides. The sludge is treated with water to dissolve out the excess sulphuric acid which separates from the oily layer. The oily layer is then further washed with water after which it is neutralized with sodium hydroxide or the like to free it from any remaining sulphuric acid. The thus obtained oily layer contains a high percentage of sulphur compounds of the nature of polysulphides.

Or, after dissolving the free acid from the sludge with water the acid solution can be distilled as for example by heating to approximately 300° F. under pressure greater than atmospheric with or without the addition of live steam to yield a distillate containing a relatively high percentage of sulphur such as polysulphides. Instead of dissolving out the free acid with water the sludge can be directly steam distilled to yield a distillate high in polysulphides. The materials obtained by these treatments are high in combined sulphur content and are adapted for use in lubricating compositions.

Petroleum lubricating oil alone, or in admixture with lubricating vegetable, fish and/or animal oils, or mixtures of the same, may be used to make a product of any desired specific gravity, sulphur content, or viscosity ranging from a very mobile oil to a grease.

Various changes may be made within the scope of the appended claims in which it is desired to claim all novelty inherent in the invention as broadly as the prior art permits.

We claim:

1. A lubricating composition adapted for extreme pressure, comprising a mineral lubricating oil and a small quantity of polysulphides derived from mercaptans obtained in the refining of petroleum.

2. A lubricating composition adapted for extreme pressure, comprising a mineral lubricating oil and a small quantity of polysulphides derived from mercaptans obtained from petroleum.

3. A lubricating composition adapted for extreme pressure, comprising an oleaginous material having lubricating properties and a relatively small quantity of organic polysulphide derived from petroleum.

4. A lubricating composition adapted for extreme pressure, comprising an oleaginous material having lubricating properties and a relatively small quantity of an organic polysulphide derived from the acid sludge resulting from the treatment of petroleum hydrocarbons with sulphuric acid.

5. An extreme pressure lubricant composition comprising a hydrocarbon lubricant and a small amount, sufficient to give the mixture increased load-bearing capacity, of an alkyl tetrasulphide.

6. A lubricating composition adapted for extreme pressure comprising a mineral lubricating oil and a small quantity of organic polysulphides having from 4 to 5 atoms of sulphur per molecule and derived from petroleum.

7. An extreme pressure lubricant composition comprising a hydrocarbon lubricant and a small amount sufficient to give the mixture increased load bearing capacity of an organic polysulphide having from 4 to 5 sulphur atoms per molecule.

8. An extreme pressure lubricant composition comprising a hydrocarbon lubricant and a small amount sufficient to give the mixture increased load bearing capacity of a hydrocarbon polysulphide having from 3 to 5 atoms of sulphur per molecule.

9. An extreme pressure lubricant composition comprising a hydrocarbon lubricant and a small amount sufficient to give the mixture increased load bearing capacity of an alkyl pentasulphide.

10. A cutting oil comprising a mineral lubricating oil and a small amount sufficient to give the mixture increased extreme pressure lubrication characteristics of a hydrocarbon polysulphide wherein the hydrocarbon groups attached to the sulphur represent the same or different alkyl or aryl radicals and the number of sulphur atoms in the molecule is greater than 2.

11. A cutting oil according to claim 10 in which the number of sulphur atoms per molecule of the said hydrocarbon polysulphide is from 3 to 5.

12. A cutting oil comprising a mineral lubricating oil and about 5% by volume of a hydrocarbon polysulphide wherein the hydrocarbon groups attached to the sulphur represent the same or different alkyl or aryl radicals and the number of sulphur atoms in the molecule is greater than 2.

13. A cutting oil according to claim 10 in which the said hydrocarbon polysulphide is an aryl tetrasulphide.

LOUIS A. MIKESKA.
FLOYD LAVERNE MILLER.